United States Patent [19]

Gournay

[11] 4,100,481
[45] Jul. 11, 1978

[54] HYDROCARBON EXPLORATION WITH DISPLAY OF RE-RADIATED AND REFLECTED MICROWAVE ENERGY

[75] Inventor: Luke S. Gournay, Rockwall, Tex.

[73] Assignee: Mobil Oil Corporation, New York, N.Y.

[21] Appl. No.: 760,885

[22] Filed: Jan. 21, 1977

[51] Int. Cl.² .......................... G01V 3/12; G01V 3/16
[52] U.S. Cl. .......................................... 324/4; 324/6; 343/5 NA
[58] Field of Search ................. 324/4, 6, 1; 343/5 NA

[56] References Cited

U.S. PATENT DOCUMENTS

| | | | |
|---|---|---|---|
| 3,351,936 | 11/1967 | Feder | 324/4 X |
| 3,536,992 | 10/1970 | Jensen et al. | 324/4 |
| 3,651,395 | 3/1972 | Owen et al. | 324/6 |
| 3,741,653 | 6/1973 | Svetlinchny | 324/4 X |
| 3,745,575 | 7/1973 | Kikuchi | 324/6 X |
| 4,006,410 | 2/1977 | Roberts | 324/54 X |

Primary Examiner—Gerard R. Strecker
Attorney, Agent, or Firm—C. A. Huggett; George W. Hager, Jr.

[57] ABSTRACT

In the exploration for hydrocarbon gas, microwave energy is radiated from an antenna transported along a traverse above the surface of the earth. Microwave energy re-radiated from gas seeps is detected. Microwave energy reflected from hard targets along the traverse is also detected. Video monitors simultaneously display the detected re-radiated and reflected microwave energy. In this way, hydrocarbon gas seeps are displayed in relation to topographical features along the traverse.

9 Claims, 3 Drawing Figures

HYDROCARBON EXPLORATION WITH DISPLAY OF RE-RADIATED AND REFLECTED MICROWAVE ENERGY

BACKGROUND OF THE INVENTION

This invention relates to the exploration for hydrocarbon gas by radiating it with microwave energy and detecting the re-radiated energy and more particularly, the invention relates to the simultaneous display of re-radiated and reflected microwave energy.

Airborne exploration for hydrocarbons is described, for example, in U.S. Pat. No. 3,651,395 — Owen et al. In such exploration, a microwave transmitter and antenna radiate the surface of the earth with microwave energy.

Hydrocarbon gas often seeps from the surface of the earth above important hydrocarbon reservoirs. For example, propane has commonly been observed seeping from underground petroleum or natural gas reservoirs. Techniques for quickly and accurately locating these gas seeps are needed.

My copending application Ser. No. 628,689, filed Nov. 3, 1975, describes a particularly useful microwave radiation and detection technique for use in the exploration for hydrocarbon gases. A radar transmitter emits a pulse of microwave energy which excites molecules of certain species of gas to new molecular rotation states from which they emit, or re-radiate, energy at characteristic frequencies. This re-radiated energy is detected by the radar receiver and the resultant signal is displayed as an indicator of hydrocarbon gas.

The frequency of the re-radiated energy is substantially independent of the frequency of the radiating energy. Because of this, the transmitter frequency can be different from the expected re-radiation frequency of the gases undergoing exploration. Because the frequency of the expected re-radiation is different from the transmitter frequency, detection is possible, even at the low energy levels likely to exist at aircraft flight altitudes.

My copending application identified above describes a system which separates the detected re-radiation energy from background energy. This background is primarily due to excitation of other naturally occurring constituents of the atmosphere.

Also energy at the transmitter frequency is reflected from radiated hard targets. This reflected microwave energy contains valuable information identifying the topographical features along the line of exploration.

SUMMARY OF THE INVENTION

In accordance with this invention, detected re-radiated and reflected microwave energy are simultaneously displayed to identify detected hydrocarbon gas seeps in relation to topographic features along a line of exploration.

In carrying out the invention, an antenna is transported along a traverse above the surface of the earth while radiating microwave energy at a transmitter frequency from the antenna. Microwave energy re-radiated from gas seeps at a different frequency is detected. The detected signal from the antenna includes background, energy at the re-radiated frequency, and reflected energy at the transmitter frequency. The background component is cancelled from the received signal to produce a signal representing only re-radiated energy. This signal is applied to a plan position indicator to produce a display representing hydrocarbon gas seeps. The reflected energy signal is applied to another plan position indicator to produce a display of topographical features along the line of traverse. Television cameras convert these displays into video signals which can be recorded.

In accordance with a further aspect of this invention, different color phosphors are used on the two different displays. Color cameras convert these two different colored displays into video signals which are mixed to form a composite video signal which, when displayed, shows the topographic features along the traverse in one color and the hydrocarbon gas seeps superimposed in another color thereon.

In accordance with another aspect of the invention, navigational equipment produces a digital display of the location along the traverse. This digital display is converted to a video signal which is mixed with the video signal representing the topographic features and the gas seeps. The navigational information appears as an integral part of the final display.

The foregoing and other objects, features and advantages of the invention will be better understood from the following more detailed description and appended claims.

DESCRIPTION OF THE PREFERRED EMBODIMENT

Figure 1:
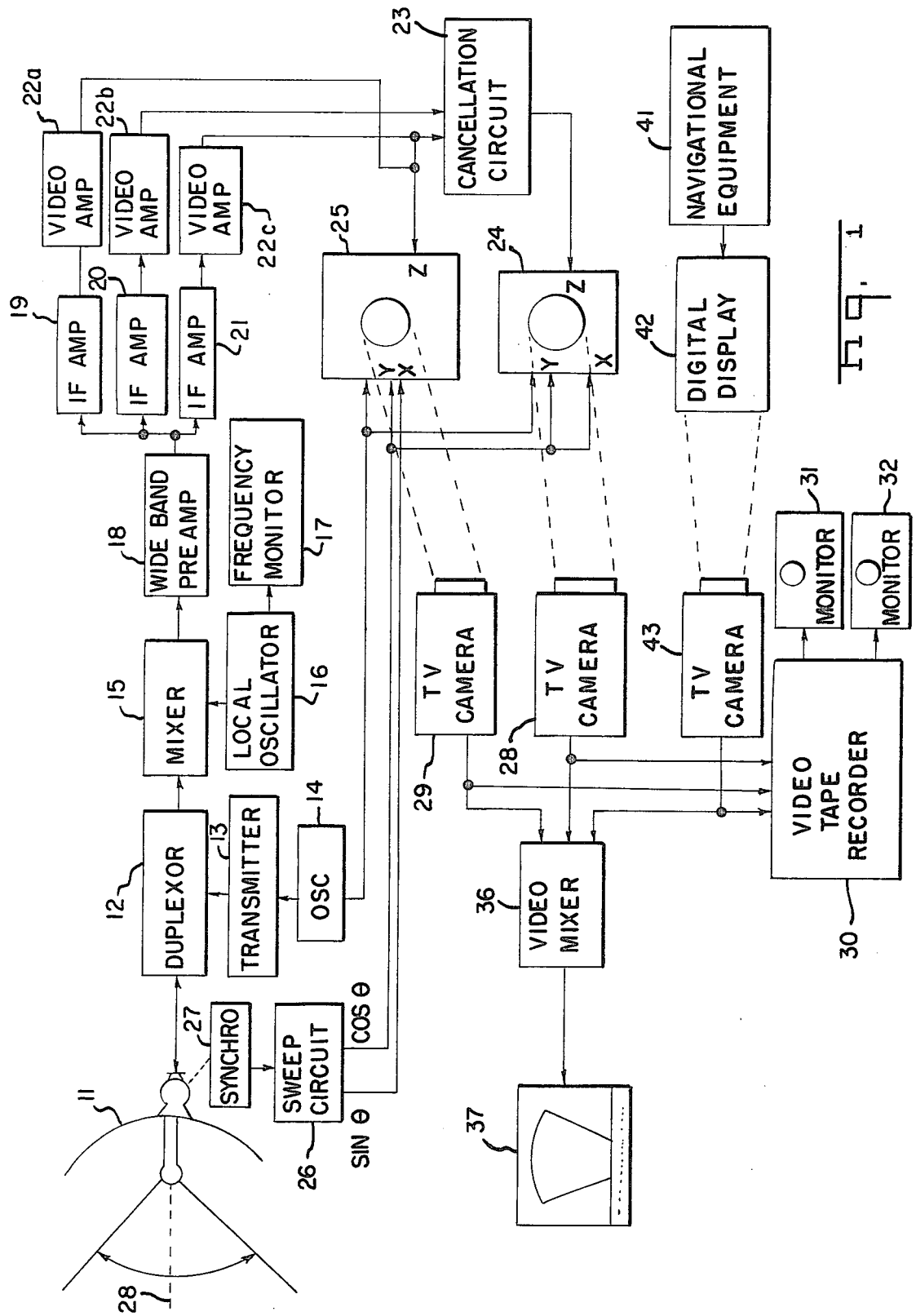
FIG. 1 shows the display system of this invention.

The antenna 11 is of the sector scanning type mounted in the nose of commercial aircraft for weather radar. In an actual embodiment of the invention the radar rotates through an arc of 120°, 60° on either side of the path of the aircraft. A cam arrangement rotates the antenna through its complete arc in two seconds and then reverses the movement so that the antenna is returned over the same arc in 2 seconds. Alternatively, a phased array antenna could be used.

The duplexor 12 and transmitter 13 are conventional radar components which produce a microwave pulse having a width between 0.25 and 2.5 microseconds, a pulse repetition rate about 1,000 per second and a peak power of 80 KW. The transmitter is triggered by oscillator 14. The transmitter frequency is approximately 20 MHZ above or below the characteristic frequency of molecular resonance of the gas undergoing exploration. In one embodiment of the invention the transmitter includes a magnetron mechanically tunable from 8600 to 9600 MHZ and which is nominally tuned to 9375 MHZ. This is 20 MHZ above the observed re-radiated signal from propane which has a frequency of 9355 MHZ.

The duplexor 12 alternately applies transmitter power to the antenna 11 and then applies the signal detected by the antenna to the receiver. The receiver includes a mixer 15.

The received microwave signal is applied from the antenna to the mixer 15 as is the signal from local oscillator 16. The local oscillator is tuned several megaherz away from one of the resonance frequencies of the gas to be identified. For example, the local oscillator is tuned to 9317 MHZ, 38 MHZ away from the re-radiation frequency of propane. Preferably mixer 15 is a non-linear balanced mixer which reduces local oscillator noise. Mixer 15 beats the local oscillator signal with the received signal to produce sum and difference signals. If the particular species of gas undergoing exploration is present in the atmosphere, a difference signal having a 38 MHZ component is produced at the output of the mixer.

A frequency monitor 17 provides a display of local oscillator frequency accurate to plus or minus 1 MHZ. It is important that the local oscillator 16 be tuned accurately. If the local oscillator drifts in frequency, then the system will not detect the gas under exploration, for example, the re-radiation of propane near 9355 MHZ.

The difference signal from the mixer 15 is amplified by the wide band pass preamplifier 18 having, for example, a band width of 100 MHZ centered about 60 MHZ. The output of preamplifier 18 is applied to three I.F. amplifiers 19, 20 and 21. I.F. amplifiers 20 and 21 are tuned, for example, to 38 MHZ and 58 MHZ respectively. That is, I.F. amplifier 20 amplifies signals 38 MHZ below and above the tuned frequency of local oscillator 16. I.F. amplifier 20 produces an output having both the re-radiated component, if it is present, and the background component of the received signal. I.F. amplifier 21 passes a signal having a component with frequencies 58 MHZ above or below the tuned frequency of oscillator 16. This component represents background energy.

The outputs of video amplifiers 20 and 21 are respectively applied to video amplifiers 22b and 22c, the outputs of which are applied to the cancellation circuit 23. The I.F. amplifiers 20 and 21, video amplifiers 22b and 22c and cancellation circuit 23 are more fully described in my copending application Ser. No. 628,689, filed Nov. 3, 1975, the disclosure of which is incorporated herein by reference. Briefly, the cancellation circuit 23 substracts the 58 MHZ background energy component from the 38 MHZ re-radiated energy component. The output of the cancellation circuit 23 represents only the re-radiated energy component. This signal is applied to modulate the intensity of the sweep of the plan position indicator 24. In order to generate a signal representing hard targets, the I.F. amplifier 19 is tuned to the transmitter frequency. The output of I.F. amplifier 19 is applied to video amplifier 22a. The component representing energy reflected from hard targets is applied to the plan position indicator 25.

Sweep signals for plan position indicators 24 and 25 are produced by oscillator 14 and sweep circuit 26. Each time the transmitter 13 is fired, a pulse from oscillator 14 starts the sweep of plan position indicators 24 and 25. Each sweep on the indicator originates at the bottom center of the screen and proceeds upward and outward in a direction coinciding with the direction of the antenna. Radial distance from the bottom center represents time and/or range and the sweep is intensity modulated to represent signals received along this range.

As the antenna 11 mechanically moves through its 120° arc, a synchro 27 produces a signal representing the position of the antenna. Specifically, synchro 27 produces a signal representing the angle $\theta$ between the direction of the antenna and the nominal aircraft heading denoted by the dashed line 28. This signal from the synchro 27 is applied to sweep circuit 26 which generates two signals representing the $\sin\theta$ and $\cos\theta$. The $\sin\theta$ and $\cos\theta$ signals are respectively applied to the X and Y sweep inputs of the indicators 24 and 25.

Figure 2:
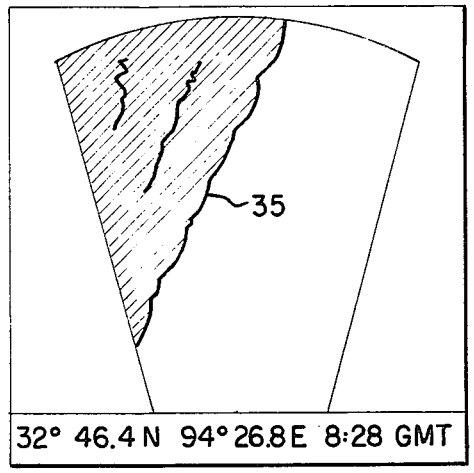
FIG. 2 depicts side-by-side displays of topographic features and hydrocarbon gas seeps.
Figure 2:
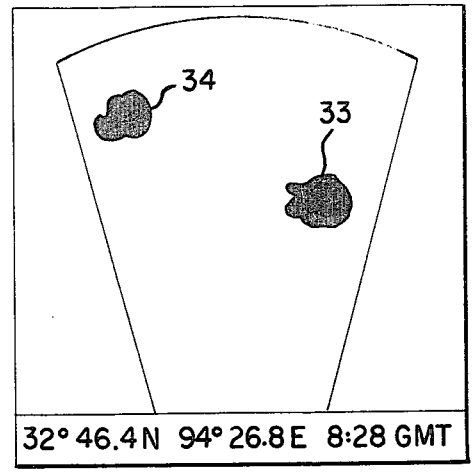

As a result, the indicators produce a pie-shaped display on the screen representing topographic features and gas seeps in 60° sectors on either side of the heading of the aircraft. FIG. 2 depicts such displays with the left hand display depicting topographic features as detected by reflections from hard targets while the right hand display depicts re-radiated energy produced for example, by propane seeps.

Conventional television cameras 28 and 29 are used to record the displays produced by indicators 24 and 25. The output of each camera is recorded on a video tape recorder, or recorders, 30. The output can be viewed in real time on the monitors 31 and 32 or can be replayed later on these monitors. Monitors 31 and 32 produce displays of the type shown in FIG. 2 wherein the topographic features and the gas seeps are displayed side-by-side. An interpreter can easily locate the gas seeps with respect to known topographic features. In FIG. 2, two gas seeps are indicated by the displays 33 and 34 of re-radiated signals. The display on the left hand side indicates topographic features, for example, a coastline 35.

As an alternative or as an additional refinement, the display of the hydrocarbon seeps may be superimposed on the display of the topographic features by using color television cameras and different color phosphors in the displays 24 and 25. For example, the display 24 can have a red emitting phosphor and the display 25 can have a green emitting phosphor. Color television cameras 28 and 29 produce video signals representing these two displays and the signals are mixed in the video mixer 36. Video mixer 36 can be a common commercial unit for superimposing two or more video pictures. On example of such a mixer is the Sony special effects video recorder. Alternatively, the primary display can be in black and white and false color can be employed in color cameras, instead of different phosphors.

Figure 3:
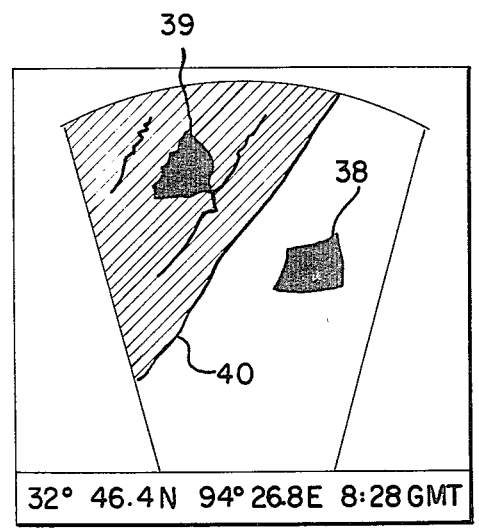
FIG. 3 depicts a display of hydrocarbon gas seeps superimposed upon a display of topographic features.

When the superimposed displays are reproduced on the color monitor 27 a display of the type depicted in FIG. 3 is produced. In this case the gas seeps are represented in red as indicated at 38 and 39 whereas the topographic features such as the coastline 40 are displayed in green.

Video mixer 36 can also be usefully employed to display navigational data concurrently with the gas seep display. Conventional aircraft navigational equipment 41 controls a digital display 42 which provides a readout of latitude, longitude and time. Television camera 43 records this display. Mixer 36 superimposeds the navigational data on the bottom of the display as is shown in FIGS. 2 and 3.

While a particular embodiment of the invention has been shown and described, other modifications are within the true spirit and scope of the invention. The appended claims are, therefore, intended to cover all such modifications.

What is claimed is:

1. The method of exploring for hydrocarbon gas seeps comprising:
    (a) transporting an antenna along a traverse above the surface of the earth,
    (b) radiating from said antenna microwave energy having a transmitter frequency which excites the gas to emit microwave energy at a re-radiated frequency characteristic of a molecular resonance of the particular species of gas,
    (c) applying the microwave energy received by said antenna to frequency discriminating circuits which produce a first signal representing reflected energy, a second signal representing both re-radiated and background energy, and a third signal representing only background energy, (d) applying said second and third signals to a cancellation circuit to produce a fourth signal representing only re-radiated energy, and (e) simultaneously displaying the re-radiated and reflected microwave energies represented by said first and fourth signals as a display of hydrocarbon gas seeps in relation to topographic features along said traverse.

2. The method recited in claim 1 wherein said displaying step includes:

generating video signals representing the detected reflected and re-radiated microwave energy, and recording said video signals.

3. The method recited in claim 2 further comprising: applying said video signals to two different video display monitors for displaying the topographic features and gas seeps in side-by-side relation.

4. The method recited in claim 1 wherein said displaying step includes:

generating video signals representing the detected reflected and re-radiated microwave energy, and applying said video signals to a single video display monitor for displaying said gas seeps superimposed upon said topographic features.

5. The method recited in claim 4 wherein said video display monitor is a color monitor, said method further comprising:

displaying the detected reflected energy in one color, and displaying the detected re-radiated energy in a different color.

6. The method recited in claim 1 further comprising:

periodically generating pulses of said microwave energy having a transmitter frequency for radiation from said antenna, generating video signals in timed relation with the generation of said pulses, generating sweeps on display indicators in synchronism with said sweep signals, modulating the intensity of the sweep on one indicator with the detected reflected energy for display of said topographic features, and modulating the intensity of the sweep of another display indicator with the detected re-radiated energy for display of said gas seeps.

7. The method recited in claim 6 further comprising:

rotating said antenna in an arc about said traverse, and positioning the sweep of each display indicator in accordance with the rotation of said antenna in an arc.

8. The method recited in claim 1 further comprising:

generating a digital navigational display of the latitude and longitude of said antenna as it is transported along said traverse, and simultaneously displaying the detected re-radiated energy and said digital navigational display.

9. A system for identifying a hydrocarbon gas seep comprising:

(a) a transmitter for directing a beam of microwave energy into the atmosphere at a transmitted frequency to excite the gas to emit microwave energy at a re-radiated frequency characteristic of a molecular resonance of the particular species of gas, (b) a receiver tuned to produce (i) a first signal in response to microwave signals received at said transmitted frequency and representative of topographic features, (ii) a second signal in response to microwave signals received at said re-radiated frequency, and (iii) a third signal in response to microwave signals received at a frequency other than said transmitted frequency or re-radiated frequency, said third signal being representative of unwanted background radiation over a broadband of frequencies inclusive of said transmitted and re-radiated frequencies, (c) means for determining the difference between said second and third signals to produce a fourth signal representative solely of the microwave energy emitted by the particular species of gas, and (d) means for displaying said first and second signals as a display of hydrocarbon gas seeps in relation to topographic features.

* * * * *